United States Patent
Bindal et al.

(10) Patent No.: US 11,475,545 B2
(45) Date of Patent: Oct. 18, 2022

(54) SYSTEM AND METHOD FOR CORRECTING GEOMETRIC DISTORTION IN IMAGES

(71) Applicant: NXP USA, Inc., Austin, TX (US)

(72) Inventors: Ankur Bindal, Ambala (IN); Sharath Subramanya Naidu, Munich (DE); Juhee Mala, Noida (IN)

(73) Assignee: NXP USA, Inc., Austin, TX (US)

( * ) Notice: Subject to any disclaimer, the term of this patent is extended or adjusted under 35 U.S.C. 154(b) by 175 days.

(21) Appl. No.: 16/886,269

(22) Filed: May 28, 2020

(65) Prior Publication Data
US 2021/0374919 A1 Dec. 2, 2021

(51) Int. Cl.
  *G06T 5/00* (2006.01)
  *G06T 1/60* (2006.01)
  *G06T 3/40* (2006.01)

(52) U.S. Cl.
  CPC .......... *G06T 5/006* (2013.01); *G06T 1/60* (2013.01); *G06T 3/4007* (2013.01)

(58) Field of Classification Search
  CPC ........ H04N 5/357–35721; G06T 5/006; G06T 1/60
  See application file for complete search history.

(56) References Cited

U.S. PATENT DOCUMENTS

| | | | |
|---|---|---|---|
| 8,085,320 B1 | 12/2011 | Khan et al. | |
| 9,536,287 B1 | 1/2017 | Eldar | |
| 9,633,419 B2 | 4/2017 | Baek et al. | |
| 10,572,982 B2 * | 2/2020 | Beric | H04N 5/217 |
| 2007/0188633 A1 * | 8/2007 | Mandy | G06T 3/0018 348/E5.079 |
| 2013/0016918 A1 | 1/2013 | Haribhatt et al. | |
| 2016/0205341 A1 * | 7/2016 | Hollander | H04N 13/204 375/240.08 |
| 2019/0005680 A1 * | 1/2019 | Wang | G06T 7/50 |
| 2019/0102868 A1 * | 4/2019 | Beric | H04N 5/3572 |
| 2020/0218346 A1 * | 7/2020 | Eash | G09G 5/391 |

(Continued)

FOREIGN PATENT DOCUMENTS

CN 108492263 A 9/2018

OTHER PUBLICATIONS

Darvatkar et al., "Implementation of Barrel Distortion Correction on FPGA", 2017 International Conference on Computing, Communication, Control and Automation (ICCUBEA), Aug. 17, 2017, pp. 1-6, IEEE, Piscataway, NJ, USA.

(Continued)

*Primary Examiner* — Sean T Motsinger

(57) ABSTRACT

An image processing circuit for correcting a distorted image includes an internal memory and a correction circuit. The internal memory of the image processing circuit is configured to store a radial look-up table (LUT), a set of tangential LUTs, and co-ordinates of a correction center of the distorted image. The radial LUT and the set of tangential LUTs include first and second sets of parameters to correct radial and tangential distortion of the distorted image, respectively. The correction circuit is configured to reconstruct portions of the correction LUT on-the-fly based on the radial LUT, the set of tangential LUTs, and the co-ordinates of the correction center, and correct portions of the distorted image based on the reconstructed portions of correction LUT to generate the portions of the corrected image.

20 Claims, 10 Drawing Sheets

(56) References Cited

U.S. PATENT DOCUMENTS

2021/0374919 A1* 12/2021 Bindal .................. G06T 5/006
2022/0012854 A1* 1/2022 Bindal .................. H04N 5/91
2022/0075448 A1* 3/2022 Eash .................... G06T 11/001

OTHER PUBLICATIONS

Choi et al., "An interpolation method for strong barrel lens distortion", Visual Computer, Jun. 20, 2017, pp. 1479-1491, vol. 34, No. 11, Springer, Berlin, Germany.
Awade et al., "Implementation of Barrel Distortion Correction on DSP in Real Time", 2016 International Conference on Computing Communication Control and Automation (ICCUBEA), Aug. 12, 2016, pp. 1-6, IEEE, Piscataway, NJ, USA.
Huang et al., "A Low-Complexity Scaling Scheme for Barrel Distortion Correction", 2012 Sixth International Conference on Genetic and Evolutionary Computing, Aug. 25, 2012, pp. 356-359, IEEE, Piscataway, NJ, USA.
Chen et al., "A VLSI Implementation of Barrel Distortion Correction for Wide-Angle Camera Images", IEEE Transactions on Circuits and Systems, Jan. 1, 2009, pp. 51-55, vol. 56, No. 1, IEEE, Piscataway, NJ, USA.
Blasinski et al., "FPGA Architecture for Real-Time Barrel Distortion Correction of Colour Images", 2011 IEEE International Conference on Multimedia and Expo (ICME), Jul. 11, 2011, pp. 1-6, IEEE, Piscataway, NJ, USA.
Andrade, J. et al. "Robust Radial Distortion Correction Based on Alternate Optimization", IEEE International Conference on Image Processing, pp. 2956-2960 (Aug. 19, 2016).
Garcia et al., "Computing the coefficients of lens distortion models using planar surfaces," Nov.-Dec. 2017, Journal of Electronic Imaging, vol. 26, 12 pages.

* cited by examiner

SYSTEM AND METHOD FOR CORRECTING GEOMETRIC DISTORTION IN IMAGES

BACKGROUND

The present disclosure relates generally to image processing systems, and, more particularly, to a system and a method for correcting geometric distortion in images.

Geometric distortion is typically introduced by a camera sensor of an optical system while capturing an image, and is usually caused due to a curvature of the camera lens and magnification properties of the optical system at different field-of-view points of the camera sensor. The introduction of geometric distortion while capturing the image may lead to a distorted image such that straight lines captured by the camera sensor appear curved in the distorted image whereas shapes of various objects in the distorted image appear different at different field-of-view points of the camera sensor.

Geometric distortion includes radial and tangential distortion. Geometric distortion in a captured image is typically corrected by a remapping process that is implemented by an image processing circuit of a system-on-chip and that utilizes a set of look-up tables (LUTs). In the remapping process, pixels from a distorted position in the distorted image are remapped to a corrected position in a corrected image. A large size of the set of LUTs is essential to execute the remapping process since both 'x' and 'y' co-ordinates of each pixel in the distorted image may be stored in the set of LUTs. Thus, for an 8 mega-pixel (MP) camera sensor with an image resolution of 3840×2160 and a 32-bit float value for each 'x' co-ordinate and each 'y' co-ordinate, a size of the set of LUTs maybe up to 3840×2160×2×4 bytes, i.e., 64 megabytes (MBs). The set of LUTs is generally stored in a memory external to the image processing circuit. In addition, for applications that run at a high frame rate, a high memory bandwidth, i.e., a rate at which data is read from or stored into the external memory, is utilized. Thus, a technical solution that corrects geometric distortion in images by utilizing lower sized LUTs and low memory bandwidth is needed.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

Figure 1:
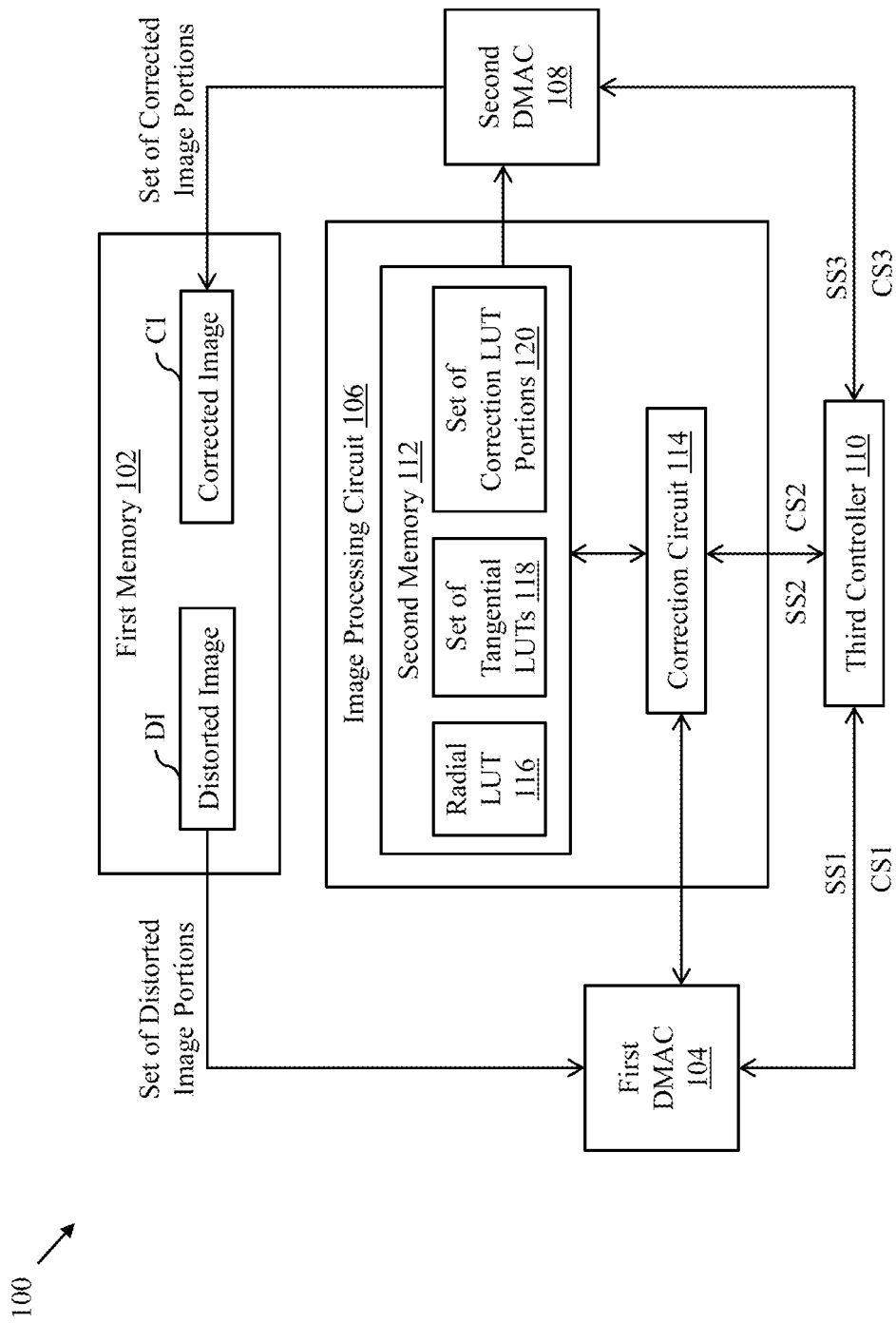
FIG. 1 is a schematic block diagram of a system-on-chip (SoC) for correcting geometric distortion in images in accordance with an embodiment of the present disclosure.

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In one embodiment, the present disclosure provides a system-on-chip (SoC) that includes an image processing circuit. The image processing circuit includes a first memory and a correction circuit that is coupled with the first memory. The first memory is configured to store a radial look-up table (LUT), a set of tangential LUTs, and co-ordinates of a correction center of a distorted image. The radial LUT includes a first set of parameters to correct radial distortion of the distorted image, and the set of tangential LUTs includes a second set of parameters to correct tangential distortion of the distorted image. The correction circuit is configured to generate a set of correction LUT portions based on the radial LUT, the set of tangential LUTs, and the co-ordinates of the correction center, and correct a set of distorted image portions of the distorted image based on the generated set of correction LUT portions to generate a set of corrected image portions of a corrected image.

In another embodiment, the present disclosure provides a method for correcting a distorted image by an SoC. The method includes storing, by a first memory of an image processing circuit of the SoC, a radial LUT, a set of tangential LUTs, and co-ordinates of a correction center of the distorted image. The radial LUT includes a first set of parameters to correct radial distortion of the distorted image, and the set of tangential LUTs includes a second set of parameters to correct tangential distortion of the distorted image. The method further includes generating, by a correction circuit of the image processing circuit, a set of correction LUT portions based on the radial LUT, the set of tangential LUTs, and the co-ordinates of the correction center. The method further includes correcting, by the correction circuit, a set of distorted image portions of the distorted image based on the generated set of correction LUT portions to generate a set of corrected image portions of a corrected image.

Various embodiments of the present disclosure provide an SoC that includes an image processing circuit for correcting a distorted image. The image processing circuit is configured to store a radial LUT, a set of tangential LUTs, and co-ordinates of a correction center of the distorted image in an internal memory, i.e., the first memory, of the image processing circuit. The radial LUT and the set of tangential LUTs include corresponding sets of parameters to correct radial distortion and tangential distortion of the distorted image, respectively. The image processing circuit is further configured to reconstruct a set of correction LUT portions on-the-fly based on the radial LUT, the set of tangential LUTs, and the co-ordinates of the correction center, and correct a set of distorted image portions of the distorted image based on the reconstructed set of correction LUT portions to generate a set of corrected image portions of a corrected image.

As a size of the radial LUT and a size of the set of tangential LUTs is significantly less than a conventional distortion correction LUT, an amount of memory required for storing the radial LUT and the set of tangential LUTs is significantly less as compared to an amount of memory required for storing the conventional distortion correction LUT. Further, as the size of the radial LUT and the size of the set of tangential LUTs is low, a need for storing the radial LUT and the set of tangential LUTs in a memory that is external to the image processing circuit is eliminated. Thus, the radial LUT and the set of tangential LUTs are stored in the internal memory. Additionally, as the radial LUT and the set of tangential LUTs are not read from the external memory, a memory bandwidth utilization of the external memory for reading the LUTs is eliminated.

Referring now to FIG. 1, a schematic block diagram of a system-on-chip (SoC) 100 for correcting geometric distortion in images, in accordance with an embodiment of the present disclosure is shown.

The SoC 100 is configured to correct the geometric distortion in a set of distorted images that includes a distorted image DI to generate a set of corrected images that includes a corrected image CI. The geometric distortion is displacement of a pixel from an intended position to a distorted position while capturing an image by a camera sensor (not shown) of an optical system (not shown). To correct the geometric distortion in images, such as the distorted image DI, a set of conventional distortion correction look-up tables (LUTs) is determined by calibrating the camera sensor to perform corrective mapping on the distorted image DI. In an example, for an 8 mega-pixel (MP) camera sensor with an image resolution of 3840×2160 and a 32-bit float value for each 'x' co-ordinate and each 'y' co-ordinate of each pixel, a size of the set of conventional distortion correction LUTs is 3840×2160×2×4 bytes, i.e., 64 megabytes (MBs). The corrective mapping is executed to map each pixel in the corrected image CI with a corresponding location in the distorted image DI. In one embodiment, the calibration of the camera sensor is performed by capturing an image having a highly structured pattern, such as a checkerboard pattern, and determining the geometric distortion based on the captured image.

The SoC 100 may be utilized in an automotive application such as an advanced driver assistance system (ADAS), a consumer application such as a home security system, or an industrial application such as an industrial robotic system. The SoC 100 includes a first memory 102, a first direct memory access controller (DMAC) 104, an image processing circuit 106, a second DMAC 108, and a third controller 110.

The first memory 102 is a system memory, i.e., an external memory to the image processing circuit 106, and is configured to receive and store the set of distorted images that includes the distorted image DI. In one embodiment, the first memory 102 receives the distorted image DI from the camera sensor. The distorted image DI includes a set of distorted image portions of which first and second distorted image portions are shown later in FIG. 2, and each of the first and second distorted image portions includes a corresponding set of pixels (not shown). In one embodiment, the set of distorted image portions may correspond to the entire distorted image DI. In another embodiment, the set of distorted image portions may correspond to a part of the distorted image DI. In one example, the first memory 102 is a random-access memory (RAM), such as a double data rate (DDR) synchronous dynamic RAM.

The first DMAC 104 is coupled to the first memory 102 and the image processing circuit 106. The first DMAC 104 is configured to retrieve the set of distorted image portions from the first memory 102 based on first data, and generate a first status signal SS1 to indicate the retrieval of each distorted image portion. The first data is associated with a set of corrected image portions of the corrected image CI of which first and second corrected image portions are shown later in FIG. 2. The first data includes dimensions, such as 'X' and 'Y' dimensions, of the set of distorted image portions that correspond to the associated dimensions of the set of corrected image portions. In one embodiment, the dimensions of each distorted image portion correspond to a width and a height of a corresponding distorted image portion, and an offset, i.e., an 'x' co-ordinate and a 'y' co-ordinate, of one of the corners of the corresponding distorted image portion. In another embodiment, the dimensions of each distorted image portion correspond to an 'x' co-ordinate and a 'y' co-ordinate of each corner, i.e., four corners, of a corresponding distorted image portion. In one embodiment, the first status signal SS1 is activated, i.e., generated at logic high state, after the retrieval of each distorted image portion, such as the first distorted image portion. The first DMAC 104 is further configured to provide the set of distorted image portions to the image processing circuit 106. The first DMAC 104 is further configured to receive a first control signal CS1 to control an operation of the first DMAC 104. In one embodiment, the first control signal CS1 at logic high state indicates the first DMAC 104 to retrieve a subsequent distorted image portion of the set of distorted image portions, from the first memory 102 after the first DMAC 104 provides a current distorted image portion of the set of distorted image portions to the image processing circuit 106. In an example, the subsequent distorted image portion is the second distorted image portion and the current distorted image portion is the first distorted image portion. In another embodiment, the first control signal CS1 at logic high state indicates the first DMAC 104 to retrieve a distorted image portion of a subsequent distorted image of the set of distorted images from the first memory 102 after the first DMAC 104 provides the distorted image DI to the image processing circuit 106.

The image processing circuit 106 is coupled with the first DMAC 104, and is configured to receive the set of distorted image portions. The image processing circuit 106 is further configured to execute an image processing function, such as image distortion correction, to process the set of distorted image portions and generate the set of corrected image portions of the corrected image CI. The image processing circuit 106 executes the image processing function to process each distorted image portion one at a time. The image processing circuit 106 includes a second memory 112 and a correction circuit 114.

The second memory 112 is an internal memory of the image processing circuit 106, and is configured to store a radial LUT 116, a set of tangential LUTs 118, the first data associated with the set of corrected image portions of the corrected image CI, and co-ordinates of a correction center of the distorted image DI. The correction center of the distorted image DI is a center of the geometric distortion, and is utilized as a reference position to determine positions of pixels in the distorted image DI and the corrected image CI. The co-ordinates, i.e., an 'x' co-ordinate and a 'y' co-ordinate, of the correction center of the distorted image DI are 'Cx' and 'Cy', respectively, and represented as (Cx, Cy). The radial LUT 116 includes a first set of parameters to correct a radial distortion of the distorted image DI, and the set of tangential LUTs 118 includes a second set of parameters to correct a tangential distortion of the distorted image DI. Radial distortion and tangential distortion are two major components of geometric distortion, i.e., the geometric distortion includes the radial distortion and the tangential distortion. Radial distortion is the most significant component of geometric distortion and is introduced due to a curvature of a lens of the optical system and a difference in magnification at different points of the camera sensor. The radial distortion is radially symmetric and is represented by equations (1) and (2) given below:

$$x_d = x_u(1 + k_1 \cdot r_u^2 + k_2 \cdot r_u^4 + \dots) \qquad (1)$$

$$y_d = y_u(1 + k_1 \cdot r_u^2 + k_2 \cdot r_u^4 + \dots) \qquad (2)$$

where, $x_d$ and $y_d$ represent a distorted pixel position in the distorted image DI with respect to (Cx, Cy), i.e., the co-ordinates of the correction center, respectively.

$x_u$ and $y_u$ represent an undistorted pixel position in the corrected image CI with respect to (Cx, Cy), respectively, $k_1, k_2, \dots$, represent radial distortion coefficients of the distorted image DI that are obtained based on the calibration of the camera sensor, and $r_u$ represents an undistorted radius of the undistorted pixel position with respect to (Cx, Cy), respectively, and is represented as $r_u = \sqrt{x_u^2 + y_u^2}$.

The equations (1) and (2) may be represented by a single equation (3) given below:

$$r_d = r_u(1 + k_1 \cdot r_u^2 + k_2 \cdot r_u^4 + \dots) \qquad (3)$$

where, $r_d$ represents a distorted radius of the distorted pixel position of the equations (1) and (2) with respect to (Cx, Cy).

The tangential distortion is introduced due to the camera sensor and the lens being in different planes. The tangential distortion is based on a position of a pixel with respect to the co-ordinates of the correction center. i.e., (Cx, Cy), and is represented by equations (4) and (5) given below:

$$x_d = x_u + (2p_1 x_u y_u + p_2(r^2 + 2x_u^2)) \qquad (4)$$

$$y_d = y_u + (p_1(r^2 + 2y_u^2) + 2p_2 x_u y_u) \qquad (4)$$

where, $p_1$ and $p_2$ represent tangential distortion coefficients of the distorted image DI that are obtained based on the calibration.

The first set of parameters in the radial LUT 116 is determined based on the equation (3), and the second set of parameters in the set of tangential LUTs 118 is determined based on the equations (4) and (5). Each parameter of the first set of parameters is derived based on a corresponding distorted radius of a set of distorted radii that is associated with the distorted image DI, and a corresponding corrected radius of a set of corrected radii that is associated with the corrected image CI. The set of distorted radii is determined based on a weighted average of the geometric distortion that is described later by way of equation (6). Each parameter of the first set of parameters in the radial LUT 116 is indexed based on a corresponding corrected radius of the set of corrected radii.

The set of tangential LUTs 118 includes first and second subsets of parameters of the second set of parameters to correct the tangential distortion associated with first and second dimensions of the distorted image DI, respectively. The first and second dimensions of the distorted image DI are 'X' and 'Y' dimensions of a two-dimensional co-ordinate system (not shown) that is used for representation of the distorted image DI. Each parameter of the first subset of parameters in the set of tangential LUTs 118 is indexed based on a corresponding 'x' co-ordinate, i.e., a single 'x' value, along the 'X' dimension, and each parameter of the second subset of parameters in the set of tangential LUTs 118 is indexed based on a corresponding 'y' co-ordinate, i.e., a single 'y' value, along the 'Y' dimension. It will be understood by a person skilled in the art that as the first and second subsets of parameters in the set of tangential LUTs 118 are stored for corresponding set of 'x' and 'y' co-ordinates, respectively, and not for each pixel in the distorted image DI, a size of the set of tangential LUTs 118 is significantly less than the set of conventional distortion correction LUTs. It will be further apparent to a person skilled in the art that although in the current embodiment, each parameter of the first subset of parameters and each parameter of the second subset of parameters is indexed based on a single 'x' value and a single 'y' value, respectively, in an alternate embodiment, each parameter of the first and second subset of parameters is indexed based on multiple 'x' and multiple 'y' values, respectively.

The first and second subsets of parameters are determined based on a weighted average of the tangential distortion along the first and second dimensions given by the equations (4) and (5), respectively. In one embodiment, the set of tangential LUTs 118 includes two tangential LUTs such as first and second tangential LUTs that include the first and second subsets of parameters, respectively. In another embodiment, the set of tangential LUTs 118 includes one tangential LUT, i.e., the first tangential LUT, that includes the first and second subsets of parameters. It will be apparent to a person skilled in the art that although in the current embodiment, the first set of parameters in the radial LUT 116 is determined based on the equation (3), and the second set of parameters in the set of tangential LUTs 118 is determined based on the equations (4) and (5), in an alternate embodiment, the first set of parameters in the radial LUT 116 and the second set of parameters in the set of tangential LUTs 118 are determined based on the set of conventional distortion correction LUTs. It will be further apparent to a person skilled in the art that although in the current embodiment, the first set of parameters in the radial LUT 116 and the second set of parameters in the set of tangential LUTs 118 are determined based on the weighted average of the geometric distortion and the tangential distortion, respectively, in an alternate embodiment, the first set of parameters in the radial LUT 116 and the second set of parameters in the set of tangential LUTs 118 are determined based on a different averaging technique, such as a median average, a root-mean-square average, or the like, of the geometric distortion and the tangential distortion, respectively.

As the radial LUT 116 and the set of tangential LUTs 118 include the first and second sets of parameters, respectively, a combined size of the radial LUT 116 and the set of tangential LUTs 118 is significantly less as compared to the size of the set of conventional distortion correction LUT that stores 'x' and 'y' co-ordinates of each pixel. In an example, for an 8 mega-pixel (MP) camera sensor with an image resolution of 3840×2160, the combined size of the radial LUT 116 and the set of tangential LUTs 118 is 32 kilobytes (KBs) which is significantly less than the size of the set of conventional distortion correction LUT, i.e., 64 MBs. Thus, the radial LUT 116 and the set of tangential LUTs 118 are stored in the second memory 112.

It will be apparent to a person skilled in the art that although in the presently preferred embodiment, the radial LUT 116 and the set of tangential LUTs 118 are stored in the second memory 112, in an alternate embodiment, the radial LUT 116 and the set of tangential LUTs 118 may be stored in the first memory 102.

The correction circuit 114 is coupled with the second memory 112, and is configured to receive the radial LUT 116, the set of tangential LUTs 118, the first data, and the co-ordinates of the correction center of the distorted image DI. The correction circuit 114 is further coupled with the first DMAC 104, and is further configured to receive the set of distorted image portions. In one embodiment, the correction circuit 114 provides the first data to the first DMAC 104 to request retrieval of a corresponding distorted image portion, such as the first distorted image portion, of the set of distorted image portions from the first memory 102. Thus, the first DMAC 104 is further configured to retrieve and provide the corresponding distorted image portion to the correction circuit 114 based on the first data.

Based on the radial LUT 116, the set of tangential LUTs 118, and the co-ordinates of the correction center, the correction circuit 114 is configured to generate, i.e., reconstruct, a set of correction LUT portions 120 to correct the geometric distortion in the distorted image DI. In one embodiment, to correct each distorted image portion, the correction circuit 114 generates a corresponding correction LUT portion, such as a first correction LUT portion, of the set of correction LUT portions 120. The first correction LUT portion is generated to correct the first distorted image portion that includes the set of pixels. To generate the first correction LUT portion, the correction circuit 114 is further configured to determine the set of corrected radii based on the set of corrected positions for the set of pixels, and the co-ordinates of the correction center. The correction circuit 114 is further configured to identify a third subset of parameters of the first set of parameters in the radial LUT 116 based on the determined set of corrected radii. In one example, the determined set of corrected radii is utilized as an index of the radial LUT 116 to identify the third subset of parameters of the first set of parameters. The correction circuit 114 is further configured to identify a fourth subset of parameters from the second subset of parameters in the set of tangential LUTs 118 based on the set of corrected positions. In one example, the set of corrected positions is utilized as an index of the set of tangential LUTs 118 to identify the fourth subset of parameters of the first set of parameters. The fourth subset of parameters includes one or more parameters corresponding to the set of corrected positions from each of the first and second subsets of parameters in the set of tangential LUTs 118.

The correction circuit 114 is further configured to determine a set of distorted positions of the set of pixels based on the third and fourth subsets of parameters. The first correction LUT portion includes the set of distorted positions. In one embodiment, the correction circuit 114 is configured to store the first correction LUT portion in the second memory 112. Similarly, the correction circuit 114 generates the remaining correction LUT portions of the set of correction LUT portions 120 to correct corresponding distorted image portions of the set of distorted image portions. It will be apparent to a person skilled in the art that as the correction circuit 114 generates the first correction LUT portion on-the-fly for correction of the first distorted image portion, the correction circuit 114 stores the first correction LUT portion of the set of correction LUT portions 120 in the second memory 112 at a time, thus, the entire set of correction LUT portions 120 need not be stored in the second memory 112 at a time.

The correction circuit 114 is further configured to remap the set of pixels at the set of distorted positions in a corresponding distorted image portion, i.e., the first distorted image portion, of the set of distorted image portions to the set of corrected positions based on the generated corresponding correction LUT portion, i.e., the first correction LUT portion, to correct each distorted image portion and generate a corresponding corrected image portion, i.e., the first corrected image portion. A corresponding pixel of the set of pixels is remapped to a corresponding corrected position of the set of corrected positions, one at a time. Similarly, to generate the remaining corrected image portions of the set of corrected image portions, the correction circuit 114 corrects corresponding distorted image portions of the set of distorted image portions. The correction circuit 114 corrects a current distorted image portion of the set of distorted image portions, receives a subsequent distorted image portion of the set of distorted image portions, and generates a corresponding correction LUT portion of the set of correction LUT portions 120 to correct the subsequent distorted image portion, parallelly.

The correction circuit 114 is thus configured to correct the set of distorted image portions based on the generated set of correction LUT portions 120. On correcting the set of distorted image portions, the correction circuit 114 is further configured to generate the set of corrected image portions and a second status signal SS2. The second status signal SS2 is generated to indicate the generation of each corrected image portion. In one embodiment, the second status signal SS2 is activated, i.e., generated at logic high state, after the generation of each corrected image portion of the set of corrected image portions of the corrected image CI. The correction circuit 114 is further configured to receive a second control signal CS2 to control an operation of the correction circuit 114. In one embodiment, the second control signal CS2 at logic high state indicates the correction circuit 114 to correct the subsequent distorted image portion received from the first DMAC 104 after the correction circuit 114 corrects the current distorted image portion. In another embodiment, the second control signal CS2 at logic high state indicates the correction circuit 114 to correct a distorted image portion of a subsequent distorted image of the set of distorted images after the correction circuit 114 corrects the distorted image DI. In one embodiment, the set of corrected image portions includes a first corrected image portion that corresponds to the entire corrected image CI, and the correction circuit 114 corrects a first distorted image portion of the set of distorted image portions that corresponds to the entire distorted image DI to generate the first corrected image portion, i.e., the corrected image CI.

The correction circuit 114 is further configured to store the set of corrected image portions in the second memory 112. The second memory 112 may include a first buffer (not shown) for storing the subsequent distorted image portion when the current distorted image portion is being corrected by the correction circuit 114. The second memory 112 may further include a second buffer (not shown) for storing a current corrected image portion, such as the first corrected image portion, of the set of corrected image portions when a subsequent corrected image portion, such as the second corrected image portion, of the set of corrected image portions is being generated by the correction circuit 114.

The second DMAC 108 is coupled with the second memory 112 and the first memory 102, and is configured to retrieve the set of corrected image portions from the second memory 112 and provide the set of corrected image portions of the corrected image CI to the first memory 102. In one embodiment, the second DMAC 108 retrieves and provides each corrected image portion to the first memory 102, one at a time. The second DMAC 108 is further configured to generate a third status signal SS3 to indicate reception of each corrected image portion. In one embodiment, the third status signal SS3 is activated, i.e., generated at logic high state, after the retrieval of each corrected image portion of the set of corrected image portions. The second DMAC 108 is further configured to receive a third control signal CS3 to control an operation of the second DMAC 108. In one embodiment, the third control signal CS3 at logic high state indicates the second DMAC 108 to retrieve the subsequent corrected image portion of the set of corrected image portions generated by the correction circuit 114 and store the subsequent corrected image portion in the first memory 102. In another embodiment, the third control signal CS3 at logic high state indicates the second DMAC 108 to retrieve a corrected image portion of a subsequent corrected image generated by the correction circuit 114. The first memory 102 is further configured to store the set of corrected image portions of the corrected image CI. The set of corrected image portions correspond to the entire corrected image CI. Thus, by storing the set of corrected image portions, the first memory 102 stores the corrected image CI.

The third controller 110 is coupled with the first and second DMACs 104 and 108 and the correction circuit 114, and is configured to receive the first through third status signals SS1-SS3. The third controller 110 is further configured to generate the first through third control signals CS1-CS3 to control the operations of the first DMAC 104, the correction circuit 114, and the second DMAC 108, respectively. The first through third control signals CS1-CS3 are activated when the first through third status signals SS1-SS3 are received at logic high states, respectively. The third controller 110 provides the activated first through third control signals CS1-CS3 to the first DMAC 104, the correction circuit 114, and the second DMAC 108, respectively.

Figure 2:
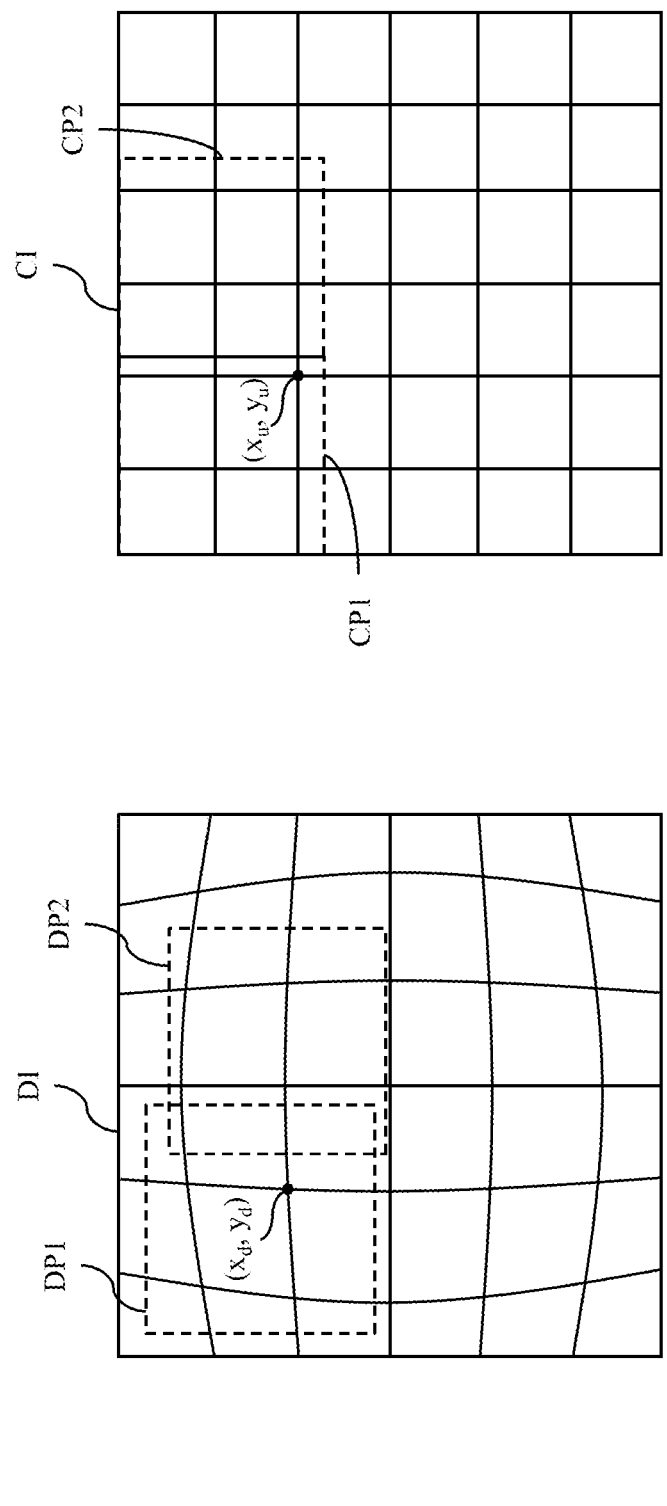
FIG. 2 is an exemplary representation of a distorted image and a corrected image that are stored in a first memory of the SoC of FIG. 1 in accordance with an embodiment of the present disclosure.

Referring now to FIG. 2, an exemplary representation 200 of the distorted image DI and the corrected image CI that are stored in the first memory 102, in accordance with an embodiment of the present disclosure is shown.

The distorted image DI includes the set of distorted image portions of which the first and second distorted image portions DP1 and DP2 are shown. The corrected image CI includes the set of corrected image portions of which the first and second corrected image portions CP1 and CP2 are shown. The correction circuit 114 corrects the first and second distorted image portions DP1 and DP2 to generate the first and second corrected image portions CP1 and CP2, respectively. Each corrected image portion, such as the first corrected image portion CP1, includes the set of pixels after the correction circuit 114 remaps each pixel of the set of pixels from a corresponding distorted position, such as ($x_d$, $y_d$), in a corresponding distorted image portion, such as the first distorted image portion DP1, to a corresponding corrected position, such as ($x_u$, $y_u$), in the first corrected image portion CP1.

Figure 3B:
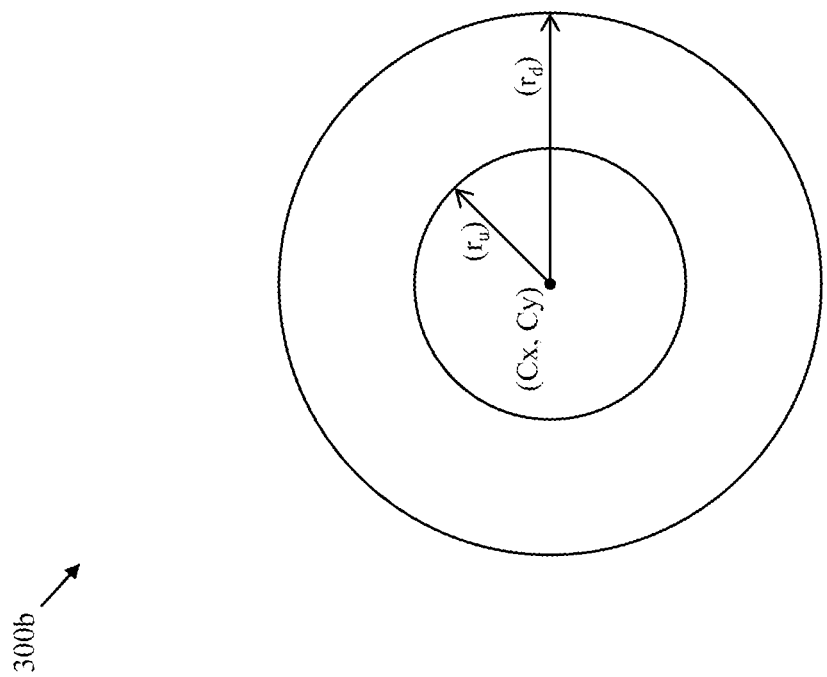
FIG. 3B is an exemplary representation of a weighted average of the geometric distortion in the distorted image in accordance with an embodiment of the present disclosure.
Figure 3A:
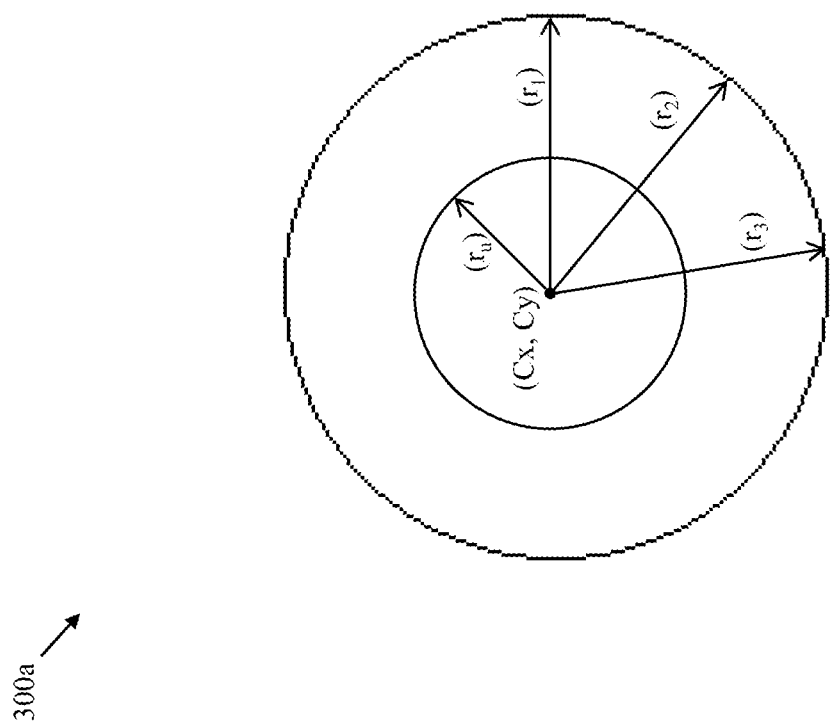
FIG. 3A is an exemplary representation of the geometric distortion in the distorted image in accordance with an embodiment of the present disclosure.

Referring now to FIG. 3A, an exemplary representation 300a of the geometric distortion in the distorted image DI, in accordance with an embodiment of the present disclosure is shown. As described by the equation (3), the radial distortion is radially symmetric with respect to the co-ordinates of the correction center, i.e., each pixel at a particular radius, such as ($r_u$) in the corrected image CI, may be remapped from each pixel at a corresponding radius, such as ($r_d$), in the distorted image DI. Each pixel at the radius ($r_u$) in the corrected image CI may correspond to pixels at different radii, such as ($r_1$, $r_2$, $r_3$, . . . ), in the distorted image DI due to the tangential distortion component of the geometric distortion as shown in the exemplary representation 300a.

Referring now to FIG. 3B, an exemplary representation 300b of the weighted average of the geometric distortion in the distorted image DI, in accordance with an embodiment of the present disclosure is shown. The weighted average of the geometric distortion for each pixel at the radius ($r_u$) is utilized to obtain the corresponding distorted radius ($r_d$) by using an equation (6) given below:

$$r_d = (r_1 * n_1 + r_2 * n_2 + r_3 * n_3)/(n_1 + n_2 + n_3) \quad (6)$$

where,
$r_d$ represents the corresponding distorted radius,
$r_1$, $r_2$, and $r_3$ represent the different radii at which the set of pixels are present in the distorted image DI, and
$n_1$, $n_2$, and $n_3$ represent the number of pixels that are present at $r_1$, $r_2$, and $r_3$, respectively.

After determining the weighted average of the geometric distortion, each pixel at the radius ($r_u$) in the corrected image CI may correspond to pixels at the corresponding distorted radius ($r_d$) in the distorted image DI as shown in the exemplary representation 300b. In one embodiment, as the weighted average of the geometric distortion may result into a decimal value, the corresponding distorted radius ($r_d$) is determined by utilizing an interpolation technique. Similarly, each distorted radius of the set of distorted radii is obtained corresponding to each corrected radius of the set of corrected radii. Thus, each parameter of the first set of parameters is derived from the set of distorted radii and the set of corrected radii based on an equation (7) given below:

$$LUT(r) = r_d/r_u \quad (7)$$

where,
LUT (r) represents a corresponding parameter of the first set of parameters.

Figure 4:
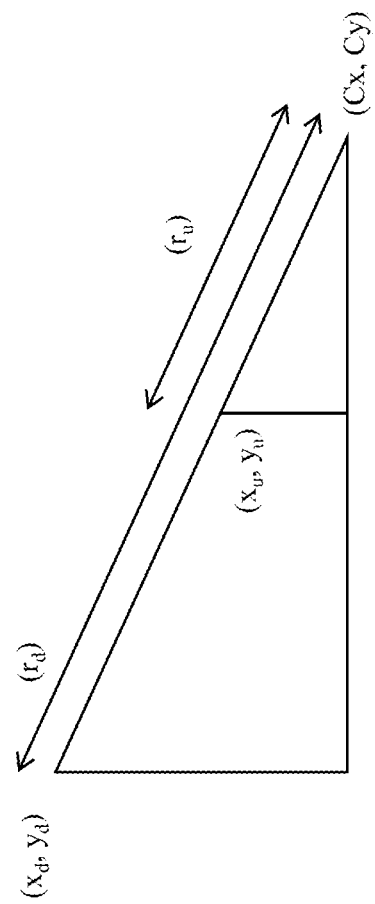
FIG. 4 is a block diagram that illustrates a trigonometric representation of a radial distortion component of the geometric distortion in the distorted image in accordance with an embodiment of the present disclosure.

Referring now to FIG. 4, a block diagram 400 illustrating a trigonometric representation of the radial distortion component of the geometric distortion in the distorted image DI, in accordance with an embodiment of the present disclosure is shown.

A pixel at a distorted position ($x_d$, $y_d$) is to be remapped at a corrected position ($x_u$, $y_u$), i.e., a pixel at a distorted radius ($r_d$) is to be remapped at a corrected radius ($r_u$). The distorted position ($x_d$, $y_d$) is at a distance equal to the distorted radius ($r_d$) from the co-ordinates of the correction center, i.e., (Cx, Cy). The corrected position ($x_u$, $y_u$) is at a distance equal to the corrected radius ($r_u$) from (Cx, Cy). A relation between the distorted position ($x_d$, $y_d$) and the corrected position ($x_u$, $y_u$) is given by equations (8) and (9) based on trigonometric ratios:

$$\frac{x_d}{r_d} = \frac{x_u}{r_u} \quad (8)$$

$$\frac{y_d}{r_d} = \frac{y_u}{r_u} \quad (9)$$

The remapping of each pixel at the set of distorted positions to the set of corrected positions is performed based on the equations (10) and (11) given below:

$$x_d = \frac{r_d}{r_u} * x_u \quad (10)$$

$$y_d = \frac{r_d}{r_u} * y_u \quad (11)$$

The correction circuit 114 receives and corrects the first distorted image portion DP1 to generate the first corrected image portion CP1 based on the first corrected LUT portion. The correction circuit 114 is configured to determine a first corrected radius of the set of corrected radii based on the first corrected position of the set of corrected positions and the co-ordinates of the correction center. The correction circuit 114 is thus configured to identify a first parameter of the first set of parameters in the radial LUT 116 corresponding to the determined first radius to correct the radial distortion. Similarly, the correction circuit 114 determines each corrected radius of the set of corrected radii and identifies each parameter of the first set of parameters to correct the radial distortion in the first distorted image portion DP1. After identifying the first parameter, the correction circuit 114 is configured to identify a second parameter of the second set of parameters in the set of tangential LUTs 118 based on the first corrected position to correct the tangential distortion. The second parameter is utilized to correct the tangential distortion along the first and second dimensions, i.e., along 'X-axis' and 'Y-axis'. Based on the first and second parameters, the correction circuit 114 is configured to remap the first pixel at a corresponding distorted position, i.e., the first distorted position, to the first corrected position. Similarly, the correction circuit 114 identifies remaining parameters of the second set of parameters to correct the tangential distortion in the first distorted image portion DP1. In one embodiment, the correction circuit 114 may utilize an interpolation technique to remap the first pixel at the first distorted position to the first corrected position.

It will be apparent to a person skilled in the art that the remaining pixels of the set of pixels are remapped by the correction circuit 114 in a manner similar to the remapping of the first pixel, to generate the first corrected image portion CPL. Thus, the correction circuit 114 corrects both the radial and tangential distortions in the first distorted image portion DP1, to correct the geometric distortion in the first distorted image portion DP1 and generate the first corrected image portion CPL. It will be further apparent to a person skilled in the art that the correction circuit 114 corrects the remaining distorted image portions of the set of distorted image portions to generate the remaining set of corrected image portions of the set of corrected image portions in a manner similar to the correction of the first distorted image portion DP1 to generate the first corrected image portion CP1.

Figure 5:
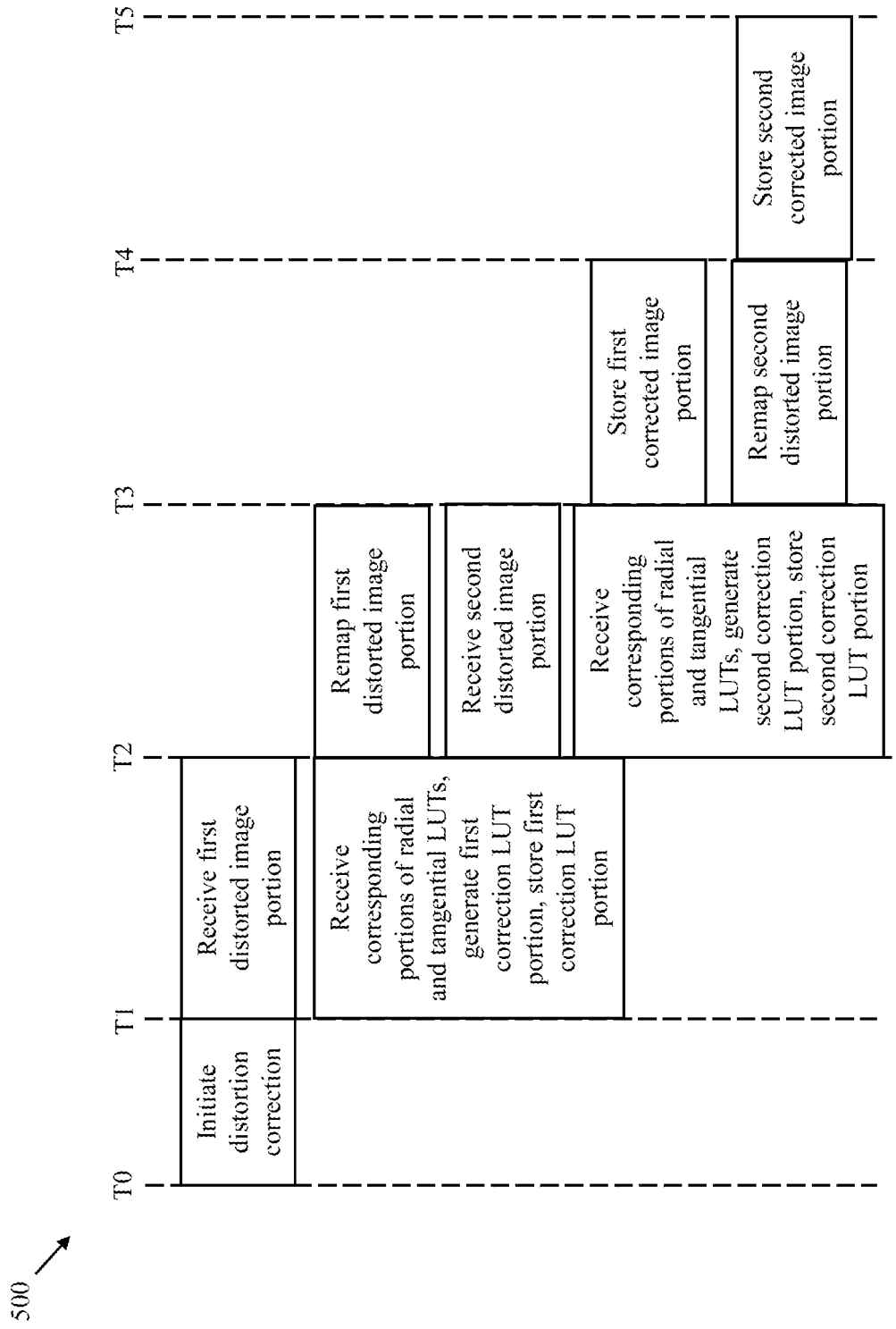
FIG. 5 is a timing diagram that illustrates an operation of the SoC of FIG. 1 in accordance with an embodiment of the present disclosure.
Figure 6A:
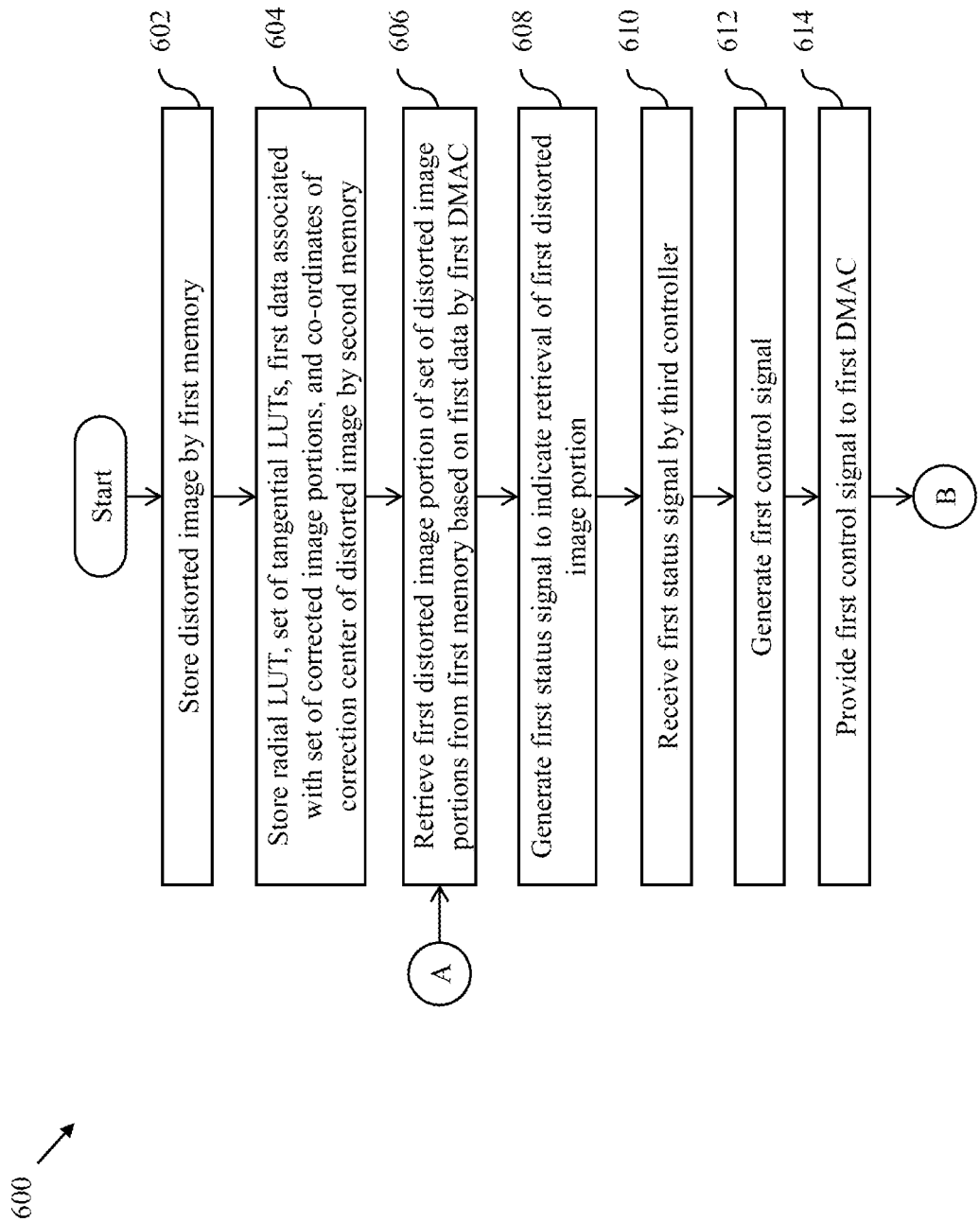
FIGS. 6A-6E, collectively, represent a flow chart that illustrates a method for correcting distorted images by the SoC of FIG. 1 in accordance with an embodiment of the present disclosure.
Figure 6B:
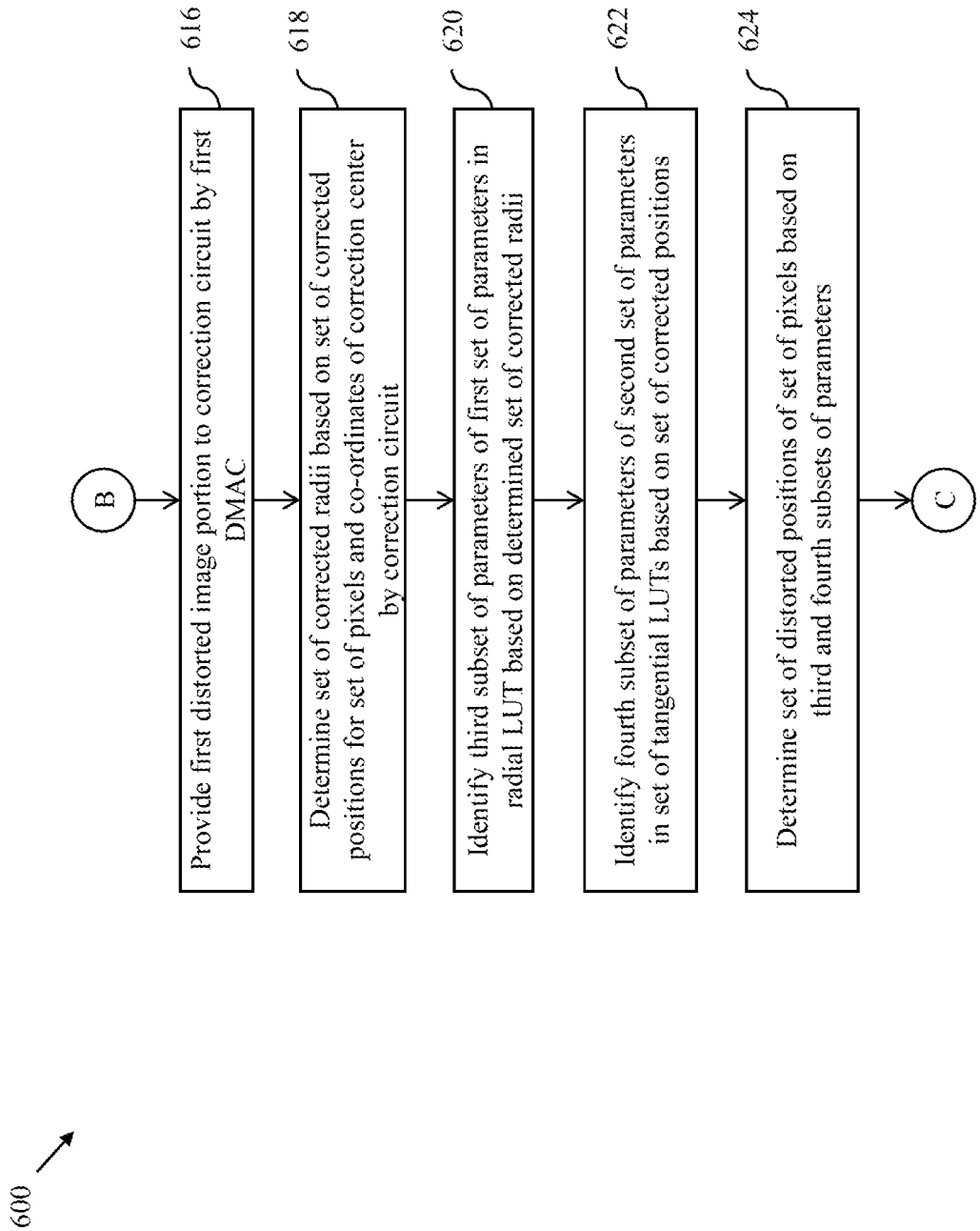
Figure 6C:
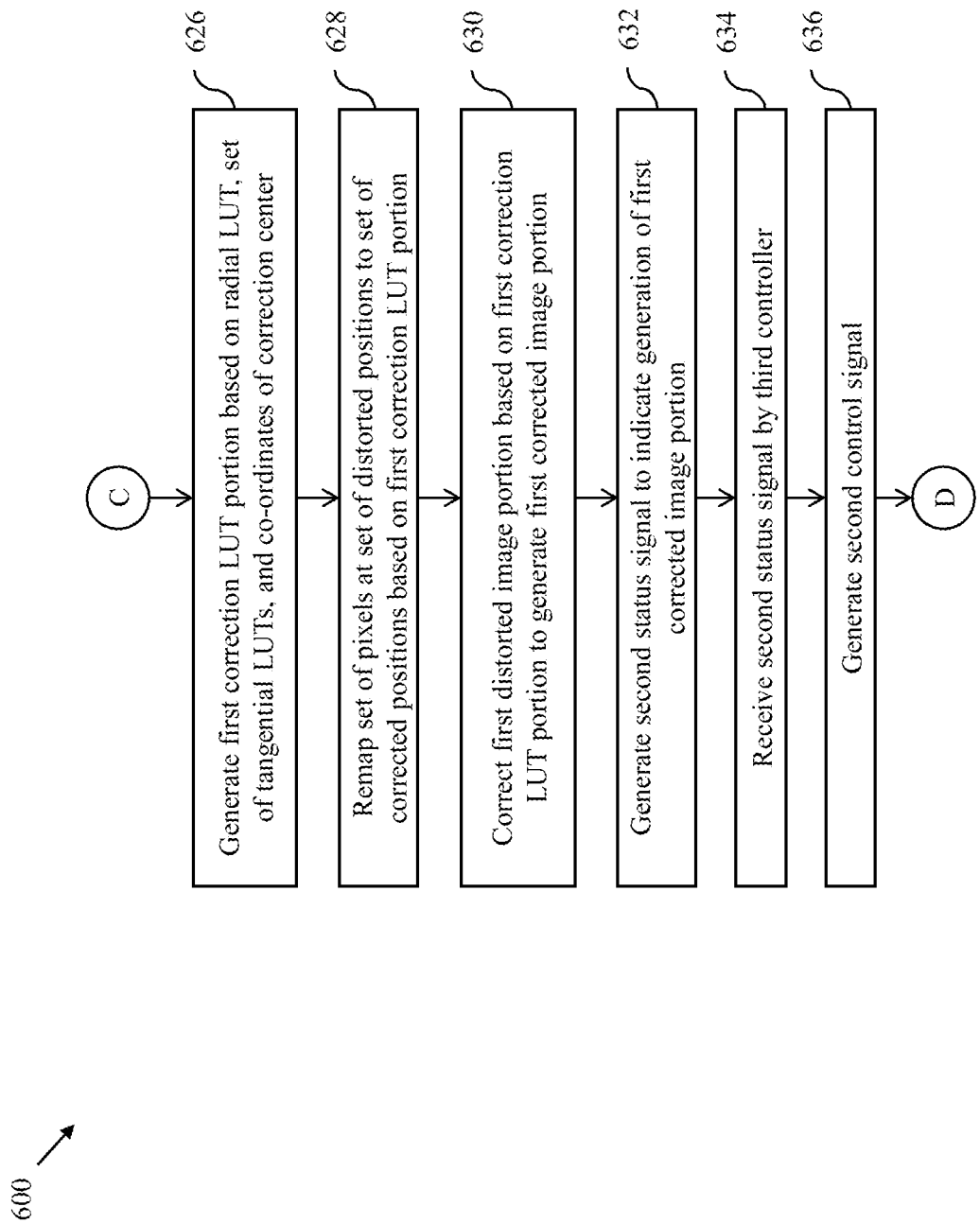
Figure 6D:
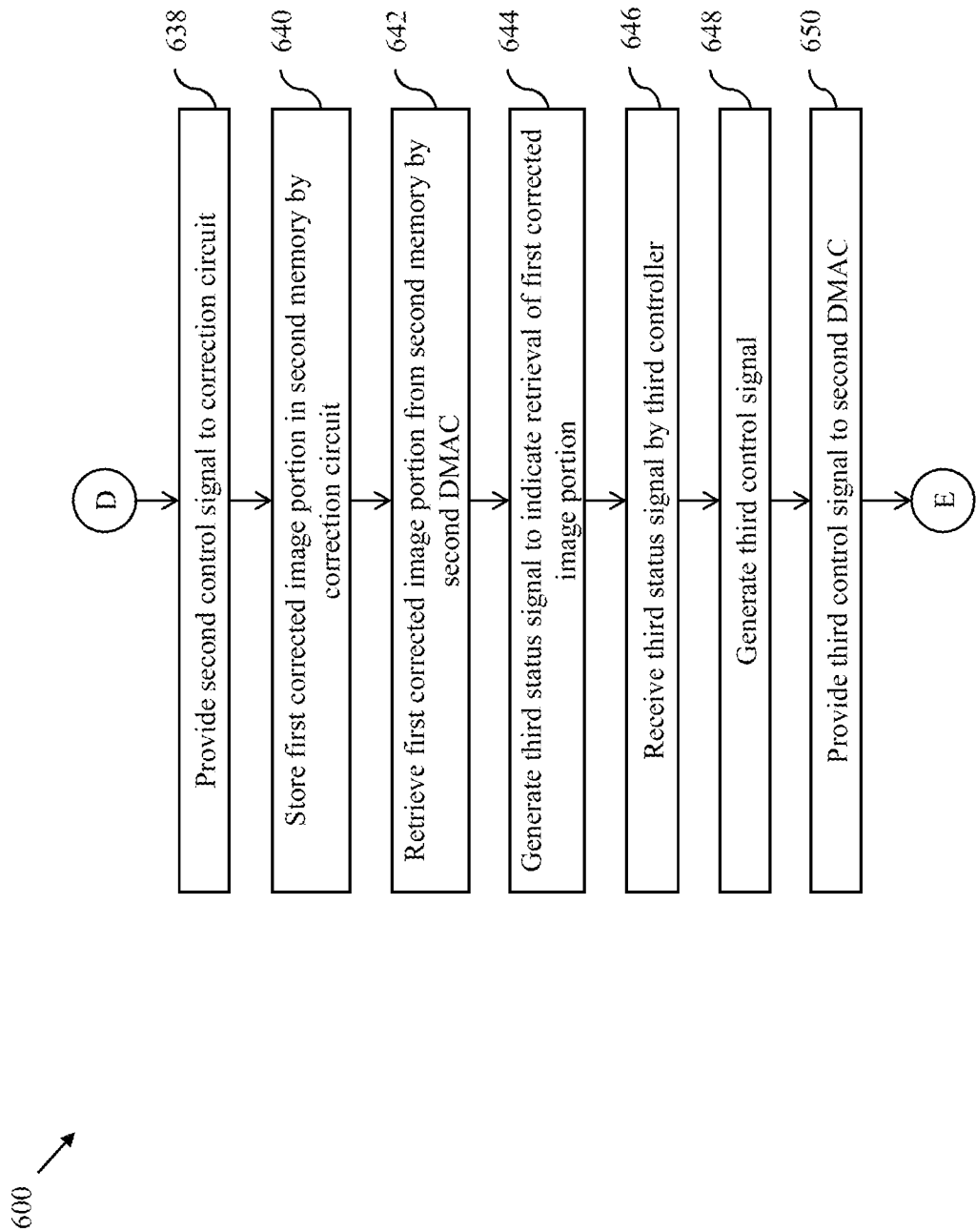
Figure 6E:
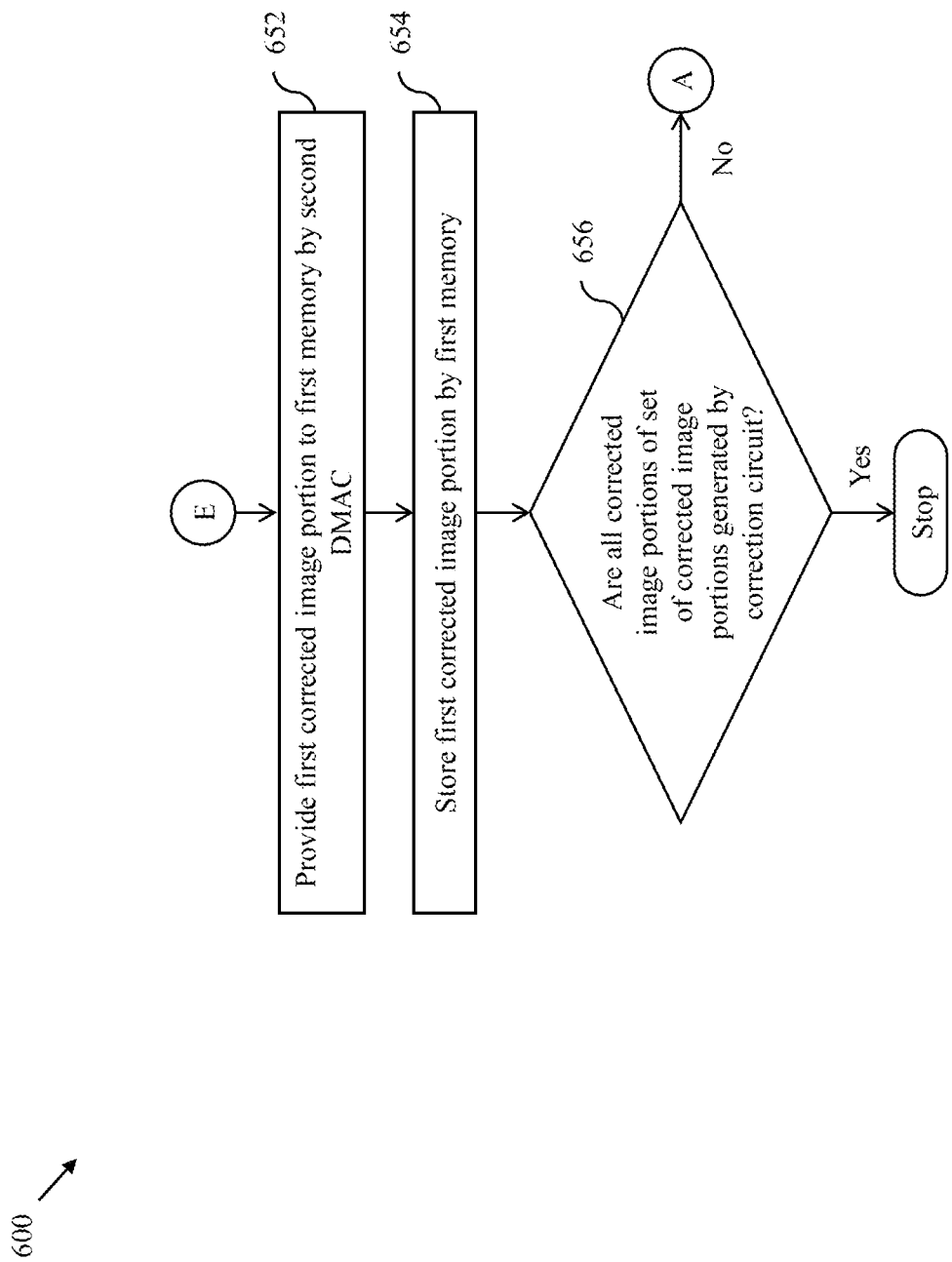

Referring now to FIG. 5, a timing diagram 500 illustrating an operation of the SoC 100 in accordance with an embodiment of the present disclosure is shown.

During time duration T0-T1, the SoC 100 initiates distortion correction of the distorted image DI. During time duration T1-T2, the correction circuit 114 receives the first distorted image portion DP1 of the distorted image DI from the first memory 102 by way of the first DMAC 104 based on the first data. The correction circuit 114 further receives a first portion of the radial LUT 116, i.e., the third subset of parameters, and a first portion of each tangential LUT, i.e., the fourth subset of parameters, of the set of tangential LUTs 118. Based on the first portion of the radial LUT 116 and the first portion of each tangential LUT, the correction circuit 114 generates the first correction LUT portion of the set of correction LUT portions 120 and stores the first correction LUT portion of the set of correction LUT portions 120 in the second memory 112.

During time duration T2-T3, the correction circuit 114 corrects the first distorted image portion DP1 to generate the first corrected image portion CP1 of the corrected image CI based on the first correction LUT portion. To correct the first distorted image portion DP1, the correction circuit 114 remaps a first subset of pixels from a first subset of distorted positions in the first distorted image portion DP1 to a first subset of corrected positions in the first corrected image portion CP1. The correction circuit 114 receives the second distorted image portion DP2 of the distorted image DI from the first memory 102 by way of the first DMAC 104 based on the first data. Further, the correction circuit 114 receives a second portion of the radial LUT 116 and a second portion of each tangential LUT. Based on the second portion of the radial LUT 116 and the second portion of each tangential LUT, the correction circuit 114 generates a second correction LUT portion of the set of correction LUT portions 120 and stores the second correction LUT portion of the set of correction LUT portions 120 in the second memory 112.

During time duration T3-T4, the correction circuit 114 stores the first corrected image portion CP1 in the second memory 112. The second DMAC 108 retrieves the first corrected image portion CP1 from the second memory 112 and provides the first corrected image portion CP1 to the first memory 102 to store the first corrected image portion CP1 in the first memory 102. The correction circuit 114 corrects the second distorted image portion DP2 to generate the second corrected image portion CP2 of the corrected image CI based on the second correction LUT portion. To correct the second distorted image portion DP2, the correction circuit 114 remaps a second subset of pixels from a second subset of distorted positions in the second distorted image portion DP2 to a second subset of corrected positions in the second corrected image portion CP2.

During time duration T4-T5, the correction circuit 114 stores the second corrected image portion CP2 in the second memory 112. The second DMAC 108 retrieves the second corrected image portion CP2 from the second memory 112 and provides the second corrected image portion CP2 to the first memory 102 to store the second corrected image portion CP2 in the first memory 102. Thus, the first and second distorted image portions DP1 and DP2 are corrected by the correction circuit 114 to generate the first and second corrected image portions CP1 and CP2, respectively. Similarly, the remaining distorted image portions are corrected by the correction circuit 114 to generate the corresponding remaining corrected image portions, thereby correcting the distorted image DI to generate the corrected image CI.

It will be apparent to a person skilled in the art that the distorted image DI may include any number of distorted image portions such that any two distorted image portions may overlap or non-overlap with each other without deviating from the scope of the present disclosure.

Referring now to FIGS. 6A-6E, a flow chart 600 illustrating a method for correcting distorted images, such as the distorted image DI, by the SoC 100, in accordance with an embodiment of the present disclosure is shown.

At step 602, the first memory 102 stores the distorted image DI. At step 604, the second memory 112 stores the radial LUT 116, the set of tangential LUTs 118, the first data associated with the set of corrected image portions, and the co-ordinates of the correction center, i.e., (Cx, Cy), of the distorted image DI.

At step 606, the first DMAC 104 retrieves a distorted image portion, such as the first distorted image portion DP1, of the set of distorted image portions from the first memory 102 based on the first data. At step 608, the first DMAC 104 generates the first status signal SS1 to indicate the retrieval of the first distorted image portion DP1. At step 610, the third controller 110 receives the first status signal SS1 from the first DMAC 104.

At step 612, the third controller 110 generates the first control signal CS1 to control the operation of the first DMAC 104. At step 614, the third controller 110 provides the first control signal CS1 to the first DMAC 104. The first control signal CS1 indicates the first DMAC 104 to retrieve a subsequent distorted image portion, i.e., the second distorted image portion DP2, from the first memory 102.

At step 616, the first DMAC 104 provides the first distorted image portion DP1 to the correction circuit 114. At step 618, the correction circuit 114 determines the set of corrected radii based on the set of corrected positions for the set of pixels, and the co-ordinates of the correction center. At step 620, the correction circuit 114 identifies the third subset of parameters of the first set of parameters in the radial LUT 116 based on the determined set of corrected radii. At step 622, the correction circuit 114 identifies the fourth subset of parameters of the second set of parameters in the set of tangential LUTs 118 based on the set of corrected positions. At step 624, the correction circuit 114 determines the set of distorted positions of the set of pixels based on the third and fourth subsets of parameters.

At step 626, the correction circuit 114 thus generates a corresponding correction LUT portion, such as the first correction LUT portion, of the set of correction LUT portions 120 based on the radial LUT 116, the set of tangential LUTs 118, and the co-ordinates of the correction center. At step 628, the correction circuit 114 remaps the set of pixels at the set of distorted positions in the first distorted image portion DP1 to the set of corrected positions based on the first correction LUT portion. At step 630, the correction circuit 114 thus corrects the first distorted image portion DP1 based on the first correction LUT portion to generate the first corrected image portion CP1.

At step 632, the correction circuit 114 generates the second status signal SS2 to indicate the generation of the first corrected image portion CP1. At step 634, the third controller 110 receives the second status signal SS2 from the correction circuit 114. At step 636, the third controller 110 generates the second control signal CS2 to control an operation of the correction circuit 114. At step 638, the third controller 110 provides the second control signal CS2 to the correction circuit 114. The second control signal CS2 indicates the correction circuit 114 to correct a subsequent distorted image portion, i.e., the second distorted image portion DP2.

At step 640, the correction circuit 114 stores the first corrected image portion CP1 in the second memory 112. At step 642, the second DMAC 108 retrieves the first corrected image portion CP1 from the second memory 112. At step 644, the second DMAC 108 generates the third status signal SS3 to indicate the retrieval of the first corrected image portion CP1. At step 646, the third controller 110 receives the third status signal SS3 from the second DMAC 108.

At step 648, the third controller 110 generates the third control signal CS3 to control the operations of the second DMAC 108. At step 650, the third controller 110 provides the third control signal CS3 to the second DMAC 108. The third control signal CS3 indicates the second DMAC 108 to retrieve a subsequent corrected image portion, i.e., the second corrected image portion CP2, from the second memory 112. At step 652, the second DMAC 108 provides the first corrected image portion CP1 to the first memory 102. At step 654, the first memory 102 stores the first corrected image portion CP1. At step 656, the third controller 110 determines whether all corrected image portions of the set of corrected image portions are generated by the correction circuit 114. If at step 656, the third controller 110 determines that all corrected image portions of the set of corrected image portions are not generated by the correction circuit 114, the steps 606-656 are executed continuously until all corrected image portions of the set of corrected image portions are generated by the correction circuit 114. Thus, the correction circuit 114 completes generation of the corrected image CI by generating all corrected image portions of the set of corrected image portions.

The combined size of the radial LUT 116 and the set of tangential LUTs 118 that include the first and second set of parameters is significantly less as compared to the size of the set of conventional distortion correction LUT that stores the 'x' and 'y' co-ordinates of each pixel. As the combined size of the radial LUT 116 and a size of the set of tangential LUTs 118 is significantly less than the set of conventional distortion correction LUT, a size of the internal memory, i.e., second memory 112, required for storing the radial LUT 116 and the set of tangential LUTs 118 is significantly less as compared to a size of memory required for storing the set of conventional distortion correction LUT. Further, as the size of the radial LUT 116 and the size of the set of tangential LUTs 118 is low, a need for storing the radial LUT 116 and the set of tangential LUTs 118 in the memory external to the image processing circuit 106, i.e., the first memory 102, is eliminated. Thus, the radial LUT 116 and the set of tangential LUTs 118 are stored in the second memory 112 that is internal to the image processing circuit 106. Additionally, as the radial LUT 116 and the set of tangential LUTs 118 are read from the second memory 112, a memory bandwidth utilization of the external memory, i.e., the first memory 102 is eliminated. Further, the set of correction LUT portions 120 is reconstructed on-the-fly, thus, a need to store the set of correction LUT portions 120 in the first memory 102, and retrieve the set of correction LUT portions 120 from the first memory 102 is eliminated.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:
1. A system-on-chip (SoC), comprising:
an image processing circuit comprising:
 a first memory that is configured to store a radial look-up table (LUT), a set of tangential LUTs, and co-ordinates of a correction center of a distorted image, wherein the radial LUT includes a first set of parameters to correct radial distortion of the distorted image, and the set of tangential LUTs includes a second set of parameters to correct tangential distortion of the distorted image; and
 a correction circuit that is coupled with the first memory, and is configured to:
  (i) generate a set of correction LUT portions based on the radial LUT, the set of tangential LUTs, and the co-ordinates of the correction center, and

(ii) correct a set of distorted image portions of the distorted image based on the generated set of correction LUT portions to generate a set of corrected image portions of a corrected image.

2. The SoC of claim 1, wherein the correction circuit is further configured to store the set of corrected image portions in the first memory, and wherein the SoC further comprises:
a second memory that is configured to store the distorted image;
a first direct memory access controller (DMAC) that is coupled with the second memory and the correction circuit, and is configured to retrieve the set of distorted image portions from the second memory based on first data associated with the set of corrected image portions of the corrected image, and provide the set of distorted image portions to the correction circuit, wherein the first data includes dimensions of the set of distorted image portions that correspond to the set of corrected image portions; and
a second DMAC that is coupled with the first memory and the second memory, and is configured to retrieve the set of corrected image portions from the first memory and provide the set of corrected image portions to the second memory, wherein the second memory is further configured to store the set of corrected image portions.

3. The SoC of claim 2, wherein the first DMAC is further configured to generate a first status signal to indicate the retrieval of each distorted image portion, wherein the correction circuit is further configured to generate a second status signal to indicate the generation of each corrected image portion, and wherein the second DMAC is further configured to generate a third status signal to indicate the retrieval of each corrected image portion.

4. The SoC of claim 3, further comprising:
a third controller that is coupled with the first and second DMACs and the correction circuit, and is configured to receive the first through third status signals and generate first through third control signals to control an operation of the first DMAC, the correction circuit, and the second DMAC, respectively.

5. The SoC of claim 1, wherein each distorted image portion includes a set of pixels, and wherein to generate a corresponding correction LUT portion of the set of correction LUT portions, the correction circuit is further configured to:
determine a set of corrected radii based on a set of corrected positions for the set of pixels and the co-ordinates of the correction center;
identify a first subset of parameters of the first set of parameters in the radial LUT based on the determined set of corrected radii;
identify a second subset of parameters of the second set of parameters in the set of tangential LUTs based on the set of corrected positions; and
determine a set of distorted positions of the set of pixels based on the first and second subsets of parameters, wherein the generated corresponding correction LUT portion includes the set of distorted positions.

6. The SoC of claim 5, wherein to correct each distorted image portion and generate a corresponding corrected image portion of the set of corrected image portions, the correction circuit is further configured to remap based on the generated corresponding correction LUT portion, the set of pixels at the set of distorted positions in a corresponding distorted image portion of the set of distorted image portions to the set of corrected positions, and wherein a corresponding pixel of the set of pixels is remapped to a corresponding corrected position of the set of corrected positions, one at a time.

7. The SoC of claim 1, wherein the set of tangential LUTs includes third and fourth subsets of parameters of the second set of parameters to correct the tangential distortion associated with first and second dimensions of the distorted image, respectively, and wherein the third and fourth subsets of parameters are determined based on a weighted average of the tangential distortion along the first and second dimensions, respectively.

8. The SoC of claim 1, wherein each parameter of the first set of parameters is derived based on a corresponding distorted radius of a set of distorted radii that is associated with the distorted image, and a corresponding corrected radius of a set of corrected radii that is associated with the corrected image.

9. The SoC of claim 8, wherein the set of distorted radii is determined based on a weighted average of geometric distortion, and wherein the geometric distortion includes the radial distortion and the tangential distortion.

10. The SoC of claim 1, wherein to generate each corrected image portion, the correction circuit corrects a corresponding distorted image portion of the set of distorted image portions, and wherein the correction circuit corrects a current distorted image portion of the set of distorted image portions, receives a subsequent distorted image portion of the set of distorted image portions, and generates a corresponding correction LUT portion of the set of correction LUT portions to correct the subsequent distorted image portion, parallelly.

11. The SoC of claim 1, wherein the set of corrected image portions includes a first corrected image portion that corresponds to the entire corrected image, wherein the correction circuit corrects a first distorted image portion of the set of distorted image portions to generate the first corrected image portion, and wherein the first distorted image portion corresponds to the entire distorted image.

12. A method for correcting a distorted image by a system-on-chip (SoC), the method comprising:
storing, by a first memory of an image processing circuit of the SoC, a radial look-up table (LUT), a set of tangential LUTs, and co-ordinates of a correction center of the distorted image, wherein the radial LUT includes a first set of parameters to correct radial distortion of the distorted image, and the set of tangential LUTs includes a second set of parameters to correct tangential distortion of the distorted image;
generating, by a correction circuit of the image processing circuit, a set of correction LUT portions based on the radial LUT, the set of tangential LUTs, and the co-ordinates of the correction center; and
correcting, by the correction circuit, a set of distorted image portions of the distorted image based on the generated set of correction LUT portions to generate a set of corrected image portions of a corrected image.

13. The method of claim 12, further comprising:
storing, by a second memory of the SoC, the distorted image;
retrieving, by a first direct memory access controller (DMAC) of the SoC, the set of distorted image portions from the second memory based on first data associated with the set of corrected image portions of the corrected image, wherein the first data includes dimensions of the set of distorted image portions that correspond to the set of corrected image portions; and
providing, by the first DMAC, the set of distorted image portions to the correction circuit.

14. The method of claim 13, further comprising:
storing, by the correction circuit in the first memory, the set of corrected image portions;
retrieving, by a second DMAC of the SoC, the set of corrected image portions from the first memory;
providing, by the second DMAC, the set of corrected image portions to the second memory; and
storing, by the second memory, the set of corrected image portions.

15. The method of claim 14, further comprising:
generating, by the first DMAC, a first status signal to indicate the retrieval of each distorted image portion;
generating, by the correction circuit, a second status signal to indicate the generation of each corrected image portion; and
generating, by the second DMAC, a third status signal to indicate the retrieval of each corrected image portion.

16. The method of claim 15, further comprising:
receiving, by a third controller, the first through third status signals; and
generating, by the third controller, first through third control signals to control an operation of the first DMAC, the correction circuit, and the second DMAC, respectively.

17. The method of claim 12, wherein the step of generating a corresponding correction LUT portion of the set of correction LUT portions by the correction circuit further comprises:
determining, by the correction circuit, a set of corrected radii based on a set of corrected positions for a set of pixels and the co-ordinates of the correction center, wherein each distorted image portion includes the set of pixels;
identifying, by the correction circuit, a first subset of parameters of the first set of parameters in the radial LUT based on the determined set of corrected radii;
identifying, by the correction circuit, a second subset of parameters of the second set of parameters in the set of tangential LUTs based on the set of corrected positions; and
determining, by the correction circuit, a set of distorted positions of the set of pixels based on the first and second subsets of parameters, wherein the generated corresponding correction LUT portion includes the set of distorted positions.

18. The method of claim 17, wherein the step of correcting each distorted image portion by the correction circuit further comprises:
remapping, by the correction circuit, the set of pixels at the set of distorted positions in a corresponding distorted image portion of the set of distorted image portions to the set of corrected positions based on the generated corresponding correction LUT portion, to generate a corresponding corrected image portion of the set of corrected image portions, wherein a corresponding pixel of the set of pixels is remapped to a corresponding corrected position of the set of corrected positions, one at a time.

19. The method of claim 12, wherein the set of tangential LUTs includes third and fourth subsets of parameters of the second set of parameters to correct the tangential distortion associated with first and second dimensions of the distorted image, respectively, and wherein the third and fourth subsets of parameters are determined based on a weighted average of the tangential distortion along the first and second dimensions, respectively.

20. The method of claim 12, wherein each parameter of the first set of parameters is derived based on a corresponding distorted radius of a set of distorted radii that is associated with the distorted image, and a corresponding corrected radius of a set of corrected radii that is associated with the corrected image, wherein the set of distorted radii is determined based on a weighted average of geometric distortion, and wherein the geometric distortion includes the radial distortion and the tangential distortion.

* * * * *